3,231,495
FINELY DIVIDED CALCIUM ACETATE PARTICLES AND LUBRICATING COMPOSITIONS THEREOF
Arnold Jesse Morway, Clark, and Albert John Bodner, Linden, N.J., assignors to Esso Research and Engineering Company, a corporation of Delaware
No Drawing. Filed Aug. 22, 1962, Ser. No. 218,522
2 Claims. (Cl. 252—32.5)

This application is a continuation-in-part of our copending application, Serial No. 181,458, filed March 21, 1962, and now abandoned.

This invention relates to finely divided calcium acetate particles, lubricating compositions containing said particles and uses thereof, methods for forming said finely divided calcium acetate particles, and methods for forming said lubricating compositions. In a particular embodiment, this invention relates to reversible lubricating compositions containing finely divided calcium acetate particles having a median particle size of less than 5 microns.

GENERAL

Calcium acetate is known to be very desirable in the preparation of fluid lubricants and lubricating greases. Lubricants containing substantial amounts of this salt possess extreme pressure (EP) and anti-wear properties. Such lubricants have found wide commercial acceptance. Because of the insolubility of calcium acetate in lubricating oils, it has generally been the practice of industry to use either surfactants, or more frequently, metal salts and soaps of higher fatty acids (e.g., $C_7$ to $C_{30}$ fatty acids), as suspending agents to maintain the calcium acetate dispersed throughout the lubricating oil. One presently followed commercial practice for preparing calcium acetate lubricants is to form the salt in situ in the lubricating oil by neutralization of acetic acid or its anhydride with lime. This can be done in the presence of a preformed dispersing agent. More frequently, it is done in the presence of a higher molecular weight fatty acid (e.g., 12 hydroxy stearic acid), which is also neutralized by the lime to form the correspondnig calcium salt or soap. The reason for the in situ preparation is to obtain the calcium acetate in an extremely finely divided form. By having the suspending agent present during the formation of the calcium acetate particles, or by simultaneously forming the suspending agent by co-neutralization, the calcium acetate particles are prevented from growing into larger particles. These larger particles, if formed, will result in the lubricant being gritty and having poor structural stability, as well as poor storage stability, the latter due to the tendency of the larger particles to settle out from the oil. This settling tendency is particularly pronounced in the case of fluid or semi-fluid lubricants. The tendency to become gritty is of particular importance in the case of solid lubricants, e.g., greases.

The in situ preparation technique has several disadvantages, however. Specifically, it requires long heating periods and very precise control of manufacturing variables to achieve the proper particle size distribution.

Moreover, the heating process normally used to eliminate the water of reaction, resulting from the neutralization of acetic acid, frequently cannot be controlled well enough in a grease plant to assure constant grease quality. Vaiiations in heating rate, maximum temperature, and total heating time affect both the particle size and the degree of hydration of the calcium acetate, and both properties markedly affect the ultimate lubricant properties. In addition, the amount of oil volatilized during the heating stage may vary so as to affect the total concentration of calcium acetate in the final product.

Additionally, the base oils which can be used to make satisfactory lubricants, particularly greases, by the aforementioned in situ technique generally have to be severely limited in viscosity and composition. Inexpensive high viscosity aromatic oils cannot be easily used in preparing a calcium acetate grease because mixing of the grease becomes difficult, and complete neutralization cannot be assured. Paraffinic oils are often unsatisfactory since the structural stability of a finished grease made from them may be poor. Also, an exactly neutral product is difficult to achieve in large scale preparations. For example, if an excess of lime is used, the free lime tends to react with the carbon dioxide of the air to form calcium carbonate, which, in turn, tends to make the lubricant gritty and form a crust upon storage. On the other hand, an excess of acid will usually impair the structural stability of the lubricant, giving it a false hardness (in the case of greases), which then disappears upon working or upon exposure to shearing stresses. This latter phenomenon is believed to be caused by hydrogen bonding of the free acid, which bonds break upon shearing. If the manufacturing is not very carefully controlled, the particle size of part of all of the salt may be too large. This, in turn, may make the grease gritty, give rise to sedimentation in the case of fluid lubricants, or reduce the thickening effect or anti-wear properties of the salt as compared to a similar lubricant containing a more finely divided salt.

The addition of commercial dry (i.e., no free unbound moisture) preformed calcium acetate, per se, to oil is not satisfactory. A typical commercial material is a rather coarse, lumpy powder having particle sizes ranging up to 100 microns or more, and averaging between 10 to 50 microns, e.g., 25 microns. When dispersed directly in a lubricating oil, the resulting composition is gritty, and has poor structural stability. When used in small concentrations to form liquid or semi-liquid lubricants, the storage stability is poor and separation usually occurs. Milling or homogenizing such oil dispersions does not result in an appreciable improvement.

Alternatively, commercial calcium acetate has been dissolved in water, emulsified with oil, and the resulting emulsion then heated to evaporate the water. Unfortunately, this technique also suffers from many of the problems of the in situ technique previously mentioned, as well as requiring the addition of energy (heat) to evaporate the large amounts of water used.

THE INVENTION

It has now been found that it is possible to form calcium acetate of exceedingly fine particle size (e.g., median particle size of 5 microns or less), which can then be added and dispersed in a lubricating oil to form the desired lubricants mentioned above. By this new technique, much of the long heating time and careful control previously necessary for the in situ formation can be avoided. Also, a much finer particle size can be achieved than is generally achieved by the in situ technique, e.g., particles of 0.1 micron diameter and 1 micron length are not uncommon when using the technique of the present invention. In addition, a wider number of base oil types can now be used. Furthermore, a unique grease can be formed from these finely divided particles which is a semi-fluid at normal temperatures, becomes a solid at temperatures above about 230° F., and reverts to a semi-fluid on cooling.

In a previous application, Serial No. 181,458, filed March 21, 1962, the present inventors described a method for chemically forming finely divided, inorganic acid salts in the presence of imidazoline salts. They have now discovered that by a somewhat analogous procedure, finely divided calcium acetate particles can be formed. These particles can be used to form excellent lubricants. Certain grease formulations containing these particles have an unusual property, i.e., they are reversible.

Briefly described, the preferred means of obtaining this small particle size is as follows: calcium acetate is dissolved in water to form a saturated solution, or more preferably, an excess of calcium acetate is mixed with water to form a concentrated calcium acetate/water slurry, e.g., 35 to 80 wt. percent of calcium acetate in water. This solution is then added to a small amount of lubricating oil (e.g., mineral lubricating oil) in which is dispersed a surface active agent of the amino imidazoline salt type. This resulting mixture is heated to drive off sufficient water to form an aqueous emulsion (about 50 wt. percent water based on the total weight of the mixture). The emulsion is then cooled to form an oatmeal-like mass, into which is mixed a relatively large amount, e.g., about 4 times the volume of said oatmeal-like mass, of a volatile hydrocarbon solvent such as heptane, etc. Solvents, such as heptane, form a partial azeotrope with water and thus aid in its removal. The solvent also removes water mechanically (entrainment). Heating is initiated and the solvent refluxed while simultaneously drawing off the water (which is heavier than the solvent and can be separated from the solvent by gravity, e.g., a trap on the reflux condenser). When substantially all of the water has been removed, e.g., the water content is less than 1.0 wt. percent., lubricating oil, e.g., 2 parts of a mineral lubricating oil is added to the emulsion residue and the solvent, e.g., heptane, removed by distillation. The resulting gel contains finely dispersed calcium acetate crystal needles less than 5 microns in length. On milling or homogenizing, an excellent grease structure is formed.

Alternatively, after the aqueous emulsion has been reduced to a water content of about 1.0 wt. percent, the resulting heptane dispersion can be reduced to dryness (without adding oil) by distilling both heptane and water from the dispersion. When all of the water has been removed, the heptane, alone, is distilled off and calcium acetate in the form of a soft-fluffy powder can be recovered (as the heptane/calcium acetate mixture becomes sufficiently concentrated, the coated calcium acetate particles precipitate out).

While not completely understood, it is believed that the acid salt of the imidazoline acts as a crystal growth inhibitor by coating the calcium acetate particles as they form, thus preventing their aggregation into larger particles.

THE IMIDAZOLINE SALTS

The amino imidazolines used in forming the imidazoline salts of the type just described include those having the general structure:

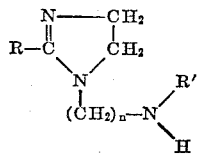

In the above formula, $n$ represents an integer of from about 2 to 6, preferably 2 to 3; R represents a $C_{12}$ to $C_{22}$, preferably a $C_{14}$ to $C_{18}$, hydrocarbon group, either saturated or unsaturated, and preferably aliphatic; while R' is either hydrogen or a $C_2$ to $C_{18}$ alkyl group. Preferably, R' is hydrogen and $n$ is a small integer, e.g., 2, in order that the effectiveness of the imidazoline can be as great as possible per pound of material. In other words, the apparent effectiveness of the imidazoline in the present invention seems to depend on the ring structure and the terminal amino group, while the number of carbon atoms in the branches merely dilutes the apparent effectiveness.

A specific example of an imidazoline of the above formula, which was used in the working examples of the invention, was a commercially available imidazoline, 1-(2 amino ethyl)-2-(n-alkyl)-2-imidazoline having the formula:

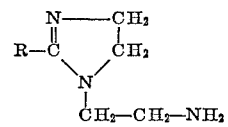

wherein R represents heptadecenyl and heptadecadienyl chains in a mole ratio of about 1:1. This product is commercially available under the trade name Nalcamine G-39M and is sold by Nalco Chemical Company, Chicago, Illinois.

The acids, which can be reacted with imidazoline to form the salts, include inorganic mineral acids such as ortho, pyro and meta phosphoric acids, hydrochloric acid, sulfuric acid, nitric acid, and also phytic acid which is closely related to phosphoric acid. Phytic acid is the preferred acid.

Phytic acid is the hexaphosphoric acid ester of inositol. It is a strong acid containing twelve acidic hydrogen groups. Its structural formula is believed to be as follows:

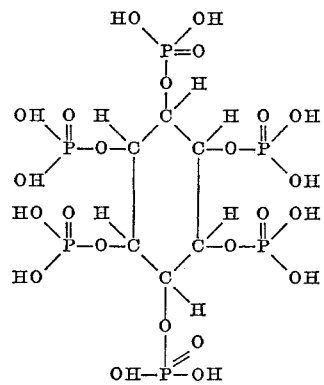

This material, having a molecular weight of 666 with 12 reactive hydrogen groups, has a combining weight (mole equivalent weight) of 55.

Phytic acid is derived from grain, and is a by-product from waste corn steep liquor. A description of phytic acid and its preparation is given in Chemical Engineering, January 27, 1958, under the title "Ion Exchange Now Yields Phytic Acid," published by McGraw-Hill Publishing Co., Inc., New York, N.Y.

The amino imidazoline salts may be prepared by mixing the imidazoline and appropriate acid in mode equivalent ratios of from 5 to 30, e.g., 8 to 20, preferably in a small amount of inert hydrocarbon oil, e.g., 0.5 to 3.0 or more parts by weight per part of combined imidazoline and acid, to form the imidazoline salt. Reaction times will generally be from 0.05 to 1 hour, more usually from 15 to 30 minutes. Temperatures of from 75 to 200° F. are usually employed, although other temperatures may be used. For best results, the relative amounts of imidazoline salt and oil should be sufficient to form a gel at 77° F.

PREPARATION OF FINELY DIVIDED CALCIUM ACETATE AND LUBRICANTS THEREFROM

In preparing the finely divided calcium acetate particles of the present invention, the amino imidazoline salt is first formed in a small amount of lubricating oil. A gel should form on gentle heating. To one part of this gel is added from 0.1 to 10 parts by weight of calcium acetate in the form of an aqueous solution or slurry, e.g., 2 to 80 wt. percent of calcium acetate in water. Mixing and heating are continued until sufficient water has been removed to form an oatmeal-like emulsion. This reduced water content will generally be in the range of 5 to 70%, e.g., 10 to 60%, by weight, of the weight of the entire oatmeal-like emulsion. From 0.5 to 8 volumes, e.g., 2 to 6 volumes, of a volatile hydrocarbon solvent is added to the gel to form a mixture. The solvent is added to aid in removing the water. The mixture is heated under total reflux, while gradually drawing off the water that is present in the gel. This water removal can be accomplished by gravity separation of the water and solvent just after the point where the water and solvent vapors are condensed prior to the solvent being returned as reflux. After substantially all of the water (e.g., 0.1 to 5.0 wt. percent water remaining) has been removed, additional oil, e.g., 1 to 10 parts by weight based on the total weight of the calcium acetate containing residue, is added and the solvent removed by distillation. The resulting gel will contain finely divided calcium acetate particles having a mean particle size of less than about 2 microns, e.g., about 1 micron, and is an effective lubricant.

Alternatively, after the water removal is complete, the solvent and oil may be removed without adding additional oil, thus leaving finely divided calcium acetate behind as a residue. On drying, the calcium acetate, coated with the amino imidazoline salt, will take on the appearance of a soft, fluffy powder (nearly all the solvent is removed by distillation—trace amounts are removed by mild heating). If the total water content is reduced to about 5 to 50 wt. percent of the entire mixture before the solvent is added, then a more finely divided salt is generally obtained than if the water content had been reduced to zero before the addition of the solvent, since removal of all the water may cause the calcium acetate particles to agglomerate.

The solvent used should be one in which the finely divided calcium acetate particles are insoluble. Suitable solvents include hydrocarbon solvents which can be aliphatic, naphthenic, aryl, alkyl aryl, etc. Preferably, the solvent will be one having a relative density of less than 1.0, e.g., 0.4 to 0.95, and one that is normally liquid, e.g., heptane.

Lubricating compositions can be prepared from the finely divided calcium acetate particles of the present invention and will generally contain from about 2 to 65 wt percent, preferably 5 to 55 wt. percent of the coated calcium acetate dispersed in oil. They may also contain silica. The lubricating composition base stock can be either a mineral oil or a synthetic oil, e.g., dibasic acid esters, phosphate esters, fluoro esters, silicones, polyphenyl ethers, etc. Alternatively, mixtures of these oils may be used.

Various other additive materials may also be included in the lubricating compositions of this invention in amounts of from about .05 to 10.0 wt. percent or more each, based on the total weight of the composition. Examples of such additives include oxidation inhibitors such as phenyl-alpha-naphthylamine, tackiness improvers such as polyisobutylene, corrosion inhibitors such as sorbitan monooleate, sodium nitrite and lanoline, waterproofing agents, dyes, V.I. improvers, thickeners and the like.

The lubricant can be homogenized in a Morehouse mill, a gaulin homogenizer, etc. If a fluid lubricant is desired, it is generally more convenient to first form an oil concentrate of the finely divided calcium acetate and then to dilute the concentrate with additional oil to form the final product.

In a particular embodiment, the finely divided calcium acetate powder of the present invention is incorporated into a grease formulation. This grease is reversible, i.e., it is a semi-fluid under normal conditions, a solid grease above 230° F., and reverts to a semi-fluid on cooling. The reversible greases are formed from the powdery, finely divided calcium acetate particles of the present invention and mineral lubricating oils having a viscosity of from about 85 to 1000 SUS at 100° F. in weight ratios of from 1:1 to 1:20, e.g., 1:2 to 1:3. Attempts to produce similar reversible compositions without first recovering the coated calcium acetate particles in the dry form have been inexplicably unsuccessful.

The silica thickening agent of the invention will preferably consist of finely divided silica particles having particle sizes of about 0.01 to .050, preferably 0.015 to 0.030 micron. These finely divided silicas can be obtained by condensation of silica fumes obtained by burning $SiCl_4$ as described in a paper by Kenneth A. Loftman which was presented to the Division of Colloid Chemistry at the 13th National Meeting of the American Chemical Society, April 14, 1960. This method is carried out as follows: essentially pure silicon tetrachloride is vaporized and transported to a furnace in which a hydrogen flame burns (1100° F.). The water vapor produced on combustion reacts with the $SiCl_4$ to give $SiO_2$ and HCl. The adsorbed HCl is driven off by heat and steam in a calciner and the finely divided $SiO_2$ is recovered. A particular silica produced by the aforesaid method and used in the working examples of this invention is commercially available from Godfrey L. Cabot, Inc. of Boston, Massachusetts under the name of Cab-O-Sil. This silica has particle sizes ranging from about 0.02 to 0.025 micron, and a bulk density of about 4.5 to 5.0 lbs./cu. ft. When used, the silica will generally be present in lubricating compositions in an amount of from 3 to 20 wt. percent, e.g., 5 to 15 wt. percent.

The preparation of the finely divided calcium acetate particles and lubricants therefrom will be more clearly understood by reference to the following examples which include a preferred embodiment. All parts are by weight unless otherwise indicated.

*Example 1*

PART A 17.2 parts of a mineral lubricating oil (Coray 55) having a viscosity of 55 SUS at 210° F. and 10 parts of an amino imidazoline (Nalcamine G–39–M) were added to a steam jacketed grease kettle and mixed together. Next, 2.2 parts of phytic acid in the form of a 70 wt. percent aqueous solution were added to the mixture. The phytic acid formed a salt with the imidazoline (Nalcamine G–39–M). A gel-like mass formed on gentle heating (125° F.).

PART B

About 70 parts of calcium acetate in the form of an aqueous solution was added to the imidazoline phytate gel formed in Part A (29.4 parts). Heating was continued until the water content had been reduced to about 50 wt. percent, thereby forming a calcium acetate/imidazoline phytate emulsion. Then 4 parts of n-heptane were added to one part of the emulsion to form a mixture. This mixture was placed in a distillation flask equipped with a reflux condenser and trap. Heating was initiated and the heptane and water refluxed. The water was gradually collected in the trap by gravity and removed. When substantially all of the water had been removed (e.g., less than 1.0 wt. percent water remaining), 2 parts of a mineral lubricating oil (Coray 55) were added and the heptane was removed by distillation. The resultant lubricating composition appeared as a gel and contained finely divided calcium acetate particles. The calcium acetate was in the form of finely dispersed crystal needles, approximately 0.1 micron in diameter and from about 0.5 to 1.0 micron long. On milling the gel, an excellent, solid grease structure was formed. The properties and formulation of that grease are shown in Table I.

*Example 2*

PART A

The procedure shown in Example 1, Parts A and B, was repeated up to the point where substantially all of the water had been removed via the trap. Then, instead of adding more oil, the heptane was removed by distillation followed by mild heating. A coated calcium acetate residue remained, and on further drying by mild oven heating, appeared as soft, fluffy needles having a particle size of from 0.5 to 1.5 microns in length and from 0.1 to 0.2 micron in diameter.

PART B

A grease was prepared by mixing and milling (without heating) 30 parts of the calcium acetate particles of Part A with 70 parts of a mineral lubricating oil (Coray 55) having a viscosity of 55 SUS at 210° F. The resulting grease had a semi-fluid consistency. On heating to 230° F., an excellent grease structure formed of about No. 1 consistency (National Lubricating Grease Institute Scale). This structure was reversible, however, and reverted to a semi-fluid consistency on cooling.

*Example 3*

A grease was prepared by mixing and milling (without heating) 30 parts of commercial mechanically pulverized granular calcium acetate particles having a particle size of about 35 to 100 microns with 70 parts of a mineral lubricating oil (Coray 55) having a viscosity of 55 SUS at 210° F. The properties of the resulting grease are shown in Table I.

*Example 4*

Ten parts of the dry, coated needle crystals of calcium acetate of Part A of Example 2 were mixed with a dispersion of 10 parts of finely divided silica (Cab-O-Sil) in 80 parts of a mineral lubricating oil (Coray 55). After mixing, the mixture was milled. The properties of the resulting grease are shown in Table I.

*Example 5*

The procedure followed in Example 2, Part A, is repeated, using ortho phosphoric acid in lieu of phytic acid. The finely divided calcium acetate obtained thereby forms an excellent grease when 40 parts of the finely divided calcium acetate are mixed and milled with 60 parts of a mineral lubricating oil.

TABLE I—FORMULATION

| Example Number | 1 | 2 | 3 | 4 |
|---|---|---|---|---|
| Formulation (by weight): | | | | |
| 1. Mineral lubricating oil (Coray-55) | 70 | 70 | 70 | 80 |
| 2. Calcium acetate | 30 | 30 | 30 | 30 |
| 3. Silica (Cab-O-Sil) | 0 | 0 | 0 | 10 |

PROPERTIES

| Properties: | | | | |
|---|---|---|---|---|
| A. Appearance | (1) | (2) | (3) | (4) |
| B. Dropping point, °F | 500+ | 500+ | (5) | 500+ |
| C. ASTM penetration at 77° F. (MM/10): | | | | |
| Unworked | 285 | (6) | (7) | 280 |
| Worked 60 strokes | 305 | (6) | (7) | 280 |
| Worked 10,000 strokes | 320 | (6) | (7) | 285 |
| Unworked at 250° F | | 320 | | 310 |
| D. AFBMA-NLGI lubrication life, hrs. at 10,000 r.p.m.: | | | | |
| 250° F | 1,102 | 992 | | 1,242 |
| 300° F | | | | 690 |
| E. Timken test (lbs.) | 45 | 35 | | 45 |
| F. Almen test: | | | | |
| Gradual (weights) | 15 | 15 | | 15 |
| Shock (weights) | 15 | 15 | | 15 |

1 Uniform, homogenous, transparent.
2 Uniform, homogenous.
3 Grainy, gritty product.
4 Smooth, homogenous.
5 Oil separates.
6 Semi-fluid.
7 Unsatisfactory grease structure.

The grease of Example 1, as shown in Table I, has excellent properties. For example, it has excellent structural stability to extensive mechanical working as shown by no loss of structure or tendency to fluidize after 10,000 strokes in an ASTM Worker. It has excellent load carrying ability as shown by carrying 45 pounds in the Timken test and it imparts excellent lubrication life to anti-friction bearings operating under the severe service of 10,000 r.p.m. and 250° F.

From Table I it can also be seen that the reversible grease of Example 2 containing the finely divided calcium acetate of the present invention had excellent properties, i.e., it is an excellent fluid lubricant having excellent extreme pressure properties (35 lbs. Timken test). At higher temperatures it solidifies and shows no tendency to leak out of poorly fitting casings, as compared with a similar grease, Example 3, which was prepared from commercially available granular calcium acetate.

The silica stabilized grease of Example 4 is a harder grease than that of Example 2 and possesses some very desirable properties, i.e., excellent structure and thermal stability combined with excellent anti-wear and high load carrying (EP) ability. It is an excellent anti-friction bearing lubricant having a long lubrication life at relatively high temperatures.

When employed in the formulation of lubricating compositions, the finely divided calcium acetate particles of the present invention are particularly effective in lubricating systems wherein a lubricant film is applied to the adjacent surfaces of parts having relative motion and wherein the lubricant film is subjected to high pressures.

While the present invention has been described with a certain degree of particularity, it should be realized that numerous modifications and adaptations can be made within the spirit and scope of the invention as hereinafter claimed.

What is claimed is:

1. A method of forming finely divided particles having a length of about 0.5 to 1.5 microns and a width of about 0.1 to 0.2 micron of calcium acetate coated with phytic acid salt of amino imidazoline, which comprises dissolving said amino imidazoline in one part of mineral lubricating oil; adding an aqueous solution of phytic acid to said oil to thereby form an imidazoline salt and a gel, wherein the total of said amino imidazoline and said phytic acid is about 0.5 to 3.0 parts by weight per part by weight of said oil, and the relative mole equivalent ratio of said imidazoline to said acid is about 8 to 20; adding about 0.1 to 10 parts by weight of calcium acetate, in the form of an aqueous mixture containing about 2 to 88 wt. percent calcium acetate, per part by weight of said gel; heating the resulting mixture to reduce its water content and form an oatmeal-like emulsion containing about 5 to 70 wt. percent water; adding about 0.5 to 8 volumes of a volatile liquid hydrocarbon solvent in which said calcium acetate is insoluble per volume of said gel; distilling the resulting mixture to remove water as an azeotrope with said solvent and drying to thereby leave a dry fluffy coated calcium acetate; and wherein said amino imidazoline has the general formula:

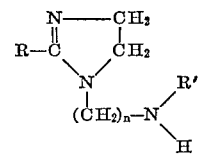

wherein $n$ is an integer of about 2 to 6, R is a $C_{12}$ to $C_{22}$ hydrocarbon group and R' is selected from the group consisting of hydrogen and $C_2$ to $C_{18}$ alkyl groups.

2. A reversible lubricating grease having the property of increasing in viscosity upon being heated, which comprises a major amount of mineral lubricating oil, and a grease thickening amount of the finely divided particles of calcium acetate coated with phytic acid salt of imidazoline of claim 1, within a weight ratio of about 1 part of said particles per 1 to 20 parts of said oil.

References Cited by the Examiner

UNITED STATES PATENTS

| | | | |
|---|---|---|---|
| 2,355,837 | 8/1944 | Wilson | 252—357 |
| 2,976,243 | 3/1961 | Morway et al. | 252—40.7 |
| 2,989,464 | 6/1961 | Panzer | 252—40.7 |
| 3,013,968 | 12/1961 | Blake | 252—18 |
| 3,065,173 | 11/1962 | Blake et al. | 252—18 |
| 3,089,848 | 5/1963 | Morway | 252—25 |

FOREIGN PATENTS

| | | |
|---|---|---|
| 1,121,260 | 1/1962 | Germany. |
| 875,732 | 8/1961 | Great Britain. |

DANIEL E. WYMAN, *Primary Examiner.*